Dec. 23, 1958 R. C. ONAN ET AL 2,865,389
GAS MIXING DEVICE
Filed May 2, 1956 2 Sheets-Sheet 1
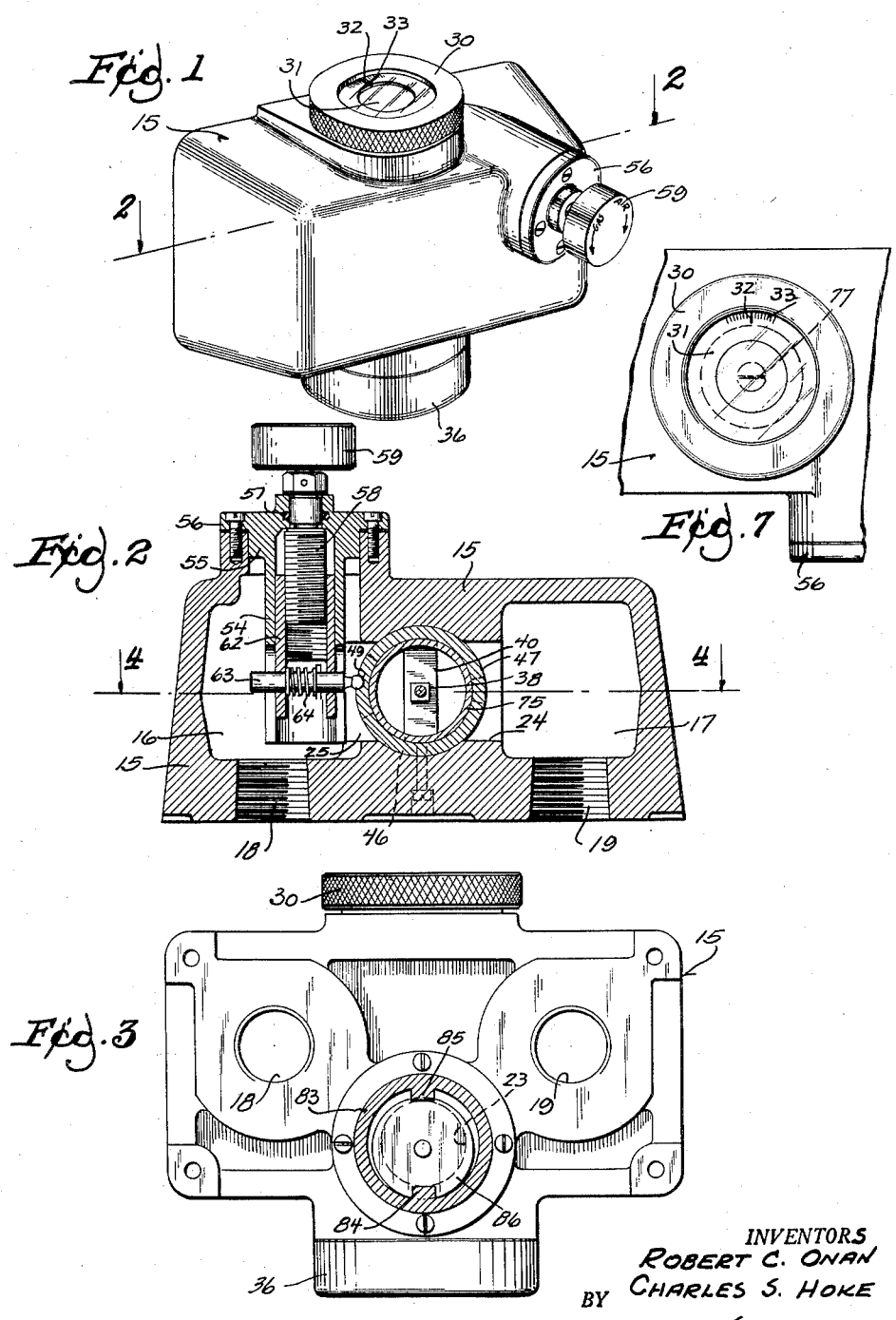
INVENTORS
ROBERT C. ONAN
BY CHARLES S. HOKE
ATTORNEY Dec. 23, 1958
R. C. ONAN ET AL
2,865,389
GAS MIXING DEVICE
Filed May 2, 1956
2 Sheets-Sheet 2
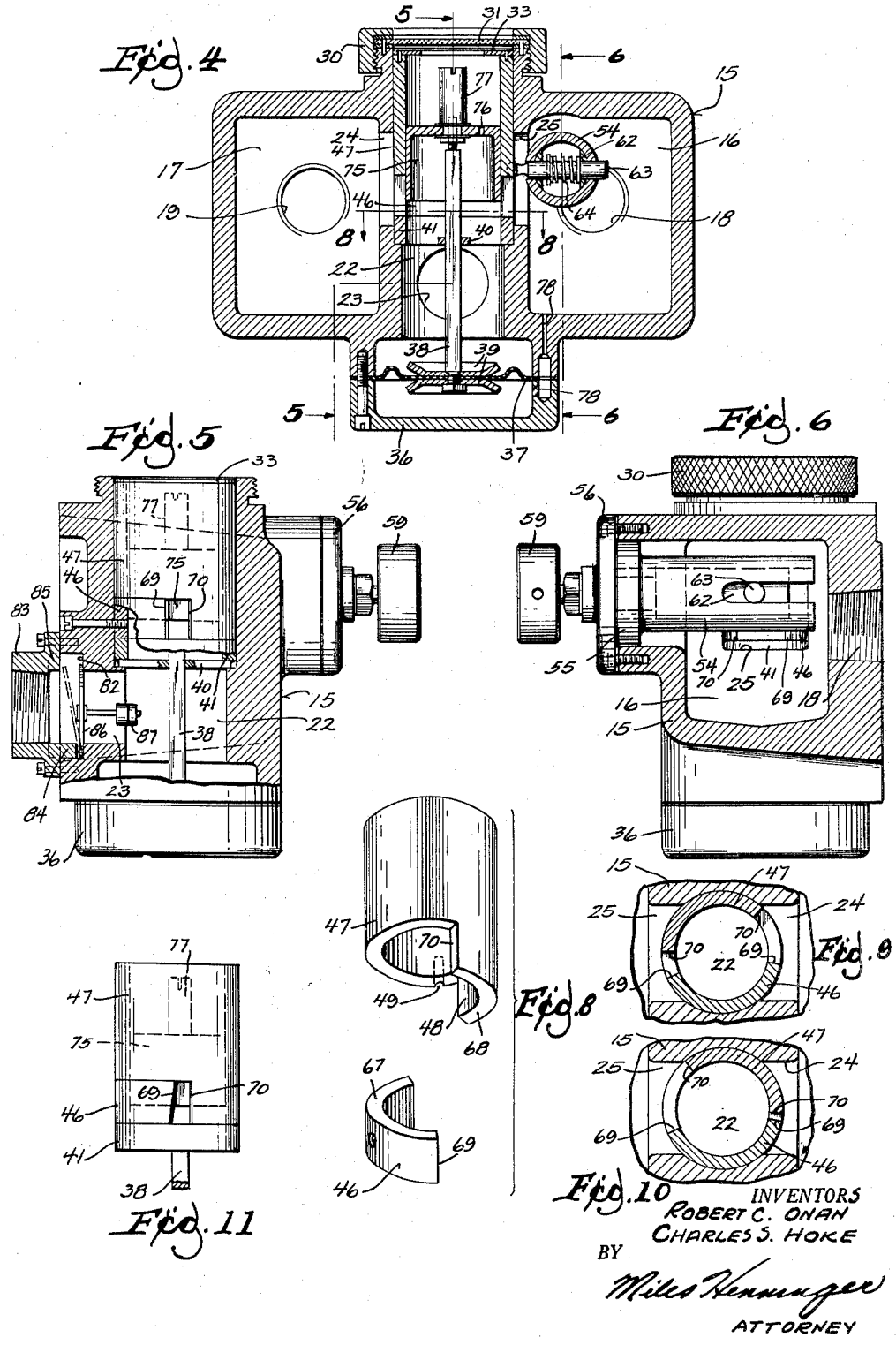
INVENTORS
ROBERT C. ONAN
CHARLES S. HOKE
BY
Miles Henninger
ATTORNEY United States Patent Office 2,865,389
Patented Dec. 23, 1958

2,865,389

GAS MIXING DEVICE

Robert C. Onan and Charles S. Hoke, Milwaukee, Wis., assignors to Waukee Engineering Company, Inc., Milwaukee, Wis., a corporation of Wisconsin Application May 2, 1956, Serial No. 582,218

9 Claims. (Cl. 137—111)

This invention relates to improvements in carburetting or mixing devices for gases whereby a plurality of gases may be combined in predetermined proportions and in quantity depending on relative gas pressures, for combustion or other chemical reactions.

It is therefore an object of the present invention to provide a device for mixing gases in given proportions and in which the proportioning means is accurately and easily adjustable to conditions known prior to or occurring during use of such device.

Another object of the invention is to provide a device for proportionally mixing gases and in which the areas of standard size ports in a casing are initially adjustable to a range of average conditions to be met, by a member interchangeably secured in the casing and are adjustable during operation of the device to exactly the conditions to be met by simple change in shape of the interchangeable member.

Another object of the invention is to provide a device for the proportional mixing of gases, in which one standard casing forms the major and most costly part of the device and only the interchange of a minor part is required to adapt the device to the conditions required for combination of any two gases, and in which movable parts are easily and quickly removed and replaced after cleaning or change of parts.

Another object of the invention is to provide a device for the proportional mixing of gases and in which the proportioning of the gases may be varied automatically as the ratio of a condition of one gas to a condition of the gas mixture changes responsive to reaction conditions.

Another object of the invention is to provide a device for the proportional mixing of gases, which can be readily mounted on a panel adjacent measuring registers and recorders without impairing ease of change of parts to meet changes in reaction condition, ease of inspection and removal of parts for cleaning for insuring accurate operation of the device and maintenance of the device in its best operating condition.

Another object of the invention is to provide a device for the proportional mixing of gases, which is fully sealed and can be used with various combinations of any two gases, without leakage of gases from the device or change in proportions of the gases or contamination of the gases by leakage of air into the device.

Another object of the invention is to provide a device for the proportional mixing of gases, in which neither the means for controlling the proportions of the gases admitted to a mixing chamber nor the means for controlling the volumes thereof, react on and interfere with the operation of the other means.

Another object of the invention is to provide a device for proportional mixing of gases, with indicating means whereby the gas proportioning means may be returned exactly to its original position after changes in the position therefor during use of the device.

A further object of the invention is to provide a device for the proportional mixing of gases which is provided with a reverse flow check valve operative free from linkages affecting sensitivity of the valve and increasing gas pressure drop during operation of the device.

Advantages and objects other than those above set forth will be apparent from the following description when read in connection with the accompanying drawings in which:

Fig. 1 is a perspective view of an assembled device embodying the present invention;

Fig. 2 is a cross-section taken on the vertical plane of line 2—2 in Fig. 1;

Fig. 3 is an elevation of the rear side of the device;

Fig. 4 is a cross-section taken on the horizontal plane of line 4—4 in Fig. 2;

Fig. 5 is a cross-sectional view taken on the vertical planes of broken line 5—5 in Fig. 4;

Fig. 6 is a cross-sectional view on the vertical plane of line 6—6 in Fig. 4;

Fig. 7 is an enlarged plan view of a closure and indicating scales associated with the mixing chamber of the device;

Fig. 8 is a perspective view of two port members of the gas proportioning means employed;

Fig. 9 is a fragmentary end view of the proportioning members in one position relative to the ports between the inlet chambers and the mixing chamber;

Fig. 10 is a view similar to Fig. 9 but showing the proportioning members in different positions; and Fig. 11 is a diagram of the relative positions of the proportioning members and of the volume control valve when a port area is to be varied dependent upon the position of the valve.

Generally, the present gas carburetting or proportional gas mixing device comprises a casing providing a first inlet chamber and a second inlet chamber to which gases are separately supplied, and a third or mixing chamber with an outlet and which is accessible from both ends of the chamber. Partitions in the casing itself are formed with ports connecting the inlet chambers with the mixing chamber and such ports have fixed and equal areas of at least the size which may be required for volumes of gases in any combination now in use. The port areas are initially proportioned to a predetermined relationship of the gases by a first proportioning member in the form of a segment of a tube secured to the inside of the mixing chamber and extending in part over both ports. The segment is easily and quickly replaceable by other segments limiting the port openings to different total areas or to different proportions dependent on the volumes of gases flowing therethrough. A second proportioning member in the form of a movable tube co-acts with the fixed segment for finer adjustment of the effective port areas to a predetermined proportioning of the gases when the gas reaction varies within a usual range of conditions. Co-acting edges of the segment and tube are readily shaped to give an automatic change in gas proportions as the volume of flow changes due to change in the reaction or total demand. The movable proportioning member is adjustable by a micrometer-type screw device for eliminating back-lash and extending from one of the inlet member chambers through a seal in the casing wall for ready removal and replacement as a unit. The mixing chamber has a closure, for one of its open ends, with a transparent window for observation of moving parts of the device and a reference scale is fixed adjacent the closure window for co-action with a reference mark on or attached to the movable proportioning member.

A piston-like valve controls the size of the port openings in use at any particular time, as it reciprocates inside the port area proportioning segment and tube to vary the volume of gases admitted to the mixing chamber responsive to demand and upon flexure of a diaphragm at the other end of such chamber. The diaphragm is under the pressure of the gas in one inlet chamber and of the mixture of the gases in the mixing chamber. The rod connecting the valve with the diaphragm is rectangular and is held against turning by a guide in the mixing chamber to relieve the diaphragm of any torsional forces acting on the valve during placement in or removal from the casing. An outlet check valve is provided for the mixing chamber and is a simple disk tilting on a portion of its edge between a seat and a stop in the outlet. The check valve is biased to seated position only by a counterweight to maintain sensitivity of the valve and minimize gas pressure drop due to the valve.

Referring specifically to the drawing by reference numerals, 15 generally designates an approximately rectangular casing providing a first gas receiving chamber 16 and a second gas receiving chamber 17 with respective inlet openings 18 and 19, and a gas mixing chamber 22 with an outlet 23. The mixing or third chamber 22 is preferably cylindrical with its axis at a right angle from one or more casing surfaces and is open at both ends for the entrance of tools for shaping the mixing chamber. The gas receiving chambers and the mixing chambers are respectively connected by ports 24 and 25 which are preferably of equal areas so that either one of the inlet chambers may be used for any one of a number of gases and which will be of adequate size for a large number of gases in various combinations. The casing is preferably a casting for low cost and gas-tight construction and the whole of the mixing chamber walls are accessible from outside the casting for shaping, the ports being merely rough openings in internal casing walls.

One end of the mixing chamber 22 has a closure comprising a ring 30 with a window 31, the ring being threaded to engage with the casing. A reference line 32 is placed on the casing window and a reference scale 33 co-acting with the line 32, is detachably secured to a moving member, the scale being preferably closely adjacent to the casing window. The other end of the mixing chamber is closed by a removable plate 36 which co-acts with the casing to retain a flexible diaphragm 37 to which is attached a rod 38 as by the use of plates 39. The rod 38 is preferably a shape other than circular and extends through a similarly shaped hole in a guide 40 to avoid torsion on the diaphragm upon assembly or disassembly of other parts of the device. The guide 40 is part of or is held in the mixing chamber by a retaining ring 41 which may also serve as positioning or bearing means for other parts.

Because the areas of the casing ports 24 and 25 are made equal for simplicity in casting the casing and are large to allow use of one casting for any gas combinations in the volume likely to be required, means are provided for interchangeably securing an initial proportioning of the port areas. One member of such means comprises a segment of a tube 46 of which the outer surface seats on the wall of the mixing chamber 22 and which has any desired internal diameter but preferably that of the guide-retaining ring 41. In the present embodiment the segment 46 is shown as being positioned by the guide-ring 41 and therefore as requiring only one screw to hold the segment removably in place. However, the ring 41 need not serve also to position the segment as the segment can be positioned on a seat machined in the casing or can be held by only two screws accessible from externally of the casing for ready interchange of the segment. The segment is shown as extending only a small distance over one port and a considerable distance over the other port, but such distances depend on the initial proportioning desired between the port opening areas.

Another member of the port area proportioning means is a tube 47 having a wall extension 48 of a size peripherally of the extension, which is substantially the difference between the inner periphery of the mixing chamber and the peripheral length of the segment 46. The outer diameter of the tube 47 is such that the tube has an easy rotatable fit in the mixing chamber and the inner diameter of the tube is preferably that of the ring 41 and the segment 46. The tube 47 may rest at one edge on the retaining ring 41 and by another edge on the segment 46 or may rest on a seat machined in the casing. The movable parts are preferably of so-called self-lubricating metal for continued easy operation.

The tube 47 has an external groove 49 extending from one edge thereof to receive a part of a unit sub-assembly for rotating the tube. Such unit comprises a support 54 extending from outside the casing into one of the inlet chambers and herein shown as being a part of a plug 55 fitting into an opening in the chamber wall and having a flange 56 by which the plug is attached to the casing. An aperture in the plug 55 is provided with a seal 57 through which the stem of a screw 58 extends and which bears in the plug, and the screw stem carries a handwheel 59. A nut 62 engages the screw 58 and travels in the support 54 axially of the screw and the support, the support holding the screw against rotation. The nut has mounted therein a pin 63 having a spherical head engageable in the groove 49 in tube 47 and the pin is movable along its own axis under the resistance of a spring 64. The screw and nut are of micrometer type for fine adjustment of the proportioning means.

A flexible connection is thus made between the screw 58 and the tube 47 whereby the tube is rotatable in the mixing chamber upon the turning of the screw to secure movement of nut 62 and pin 63 axially of the screw, the spring 64 permitting movement of the pin 63 along its own axis. The wall extension 48 of the tube is thus movable to bring two of its edges into any desired spatial relation with the respectively corresponding edges of the segment 46 as shown in Fig. 9 where the port 24 is approximately one-third the effective area of the port 25 or where the port 24 is opened wider and the port 25 is substantially closed. One of the ports may of course be fully closed if desired. The various joints at the closure 30, 31 and parts 54—56 are sealed by suitable gaskets and plate 36 is sealed by the diaphragm acting as a gasket.

It will be noted that the tube 47 also extends below the upper edges of the ports 24 and 25 so that the effective areas of such ports are defined by an edge of the ring 41, an edge of the segment 46 and two edges of the tube 47. If the ring 41 does not also serve as positioning and bearing means for the segment 41 and tube 47, and an edge of such ring does not also serve to define one edge of the effective area of the ports, it is necessary to provide a seat or seats in the casing for positioning the segment and to serve as the bearing for the wall extension of the tube.

The co-acting end edges 67 and 68 of segment 46 and tube 47 are usually formed for bearing of the tube on the segment. However, the co-acting side edges 69 and 70 of the segment or the tube, or both, may be formed at an angle to a radial plane through the segment or tube as is shown in Fig. 11 or may be curved in any manner. The effective area of any port may therefore have a shape such as shown in Fig. 11 in which a greater or lesser volume of one gas is admitted or the volume admitted of one gas, is increased and decreased a number of times over the total range of one setting of the proportioning means, dependent on the position of means for controlling the total effective port area defined by the area proportioning members.

Thus, the effective port area or both areas, may be differently shaped depending on the characteristics of the gas handled and the manner in which such characteristics affect the processing at different times. For example, in endothermic reactions the proportions of the gases may require varying during the reaction, i. e., a leaner gas-air mixture may be used when the reaction requires a low quantity of the mixture, than when a greater quantity is required to provide a given water vapor content in the reaction product. Or when the process involves a catalyst of given area, the ratio of the gas mixture flow to catalyst area may require that the ratio of the gas mixture be reduced as the velocity of mixture flow increases. Or, under some conditions, the reaction may be carried out at two or more different points or at a succession of points. A change in both areas may then be desired even though the pressure of the gas mixture may not be changed. The segment edges 69 and the tube edges 70 are easily formed to give any desired shape or area to either or both ports.

The degree of opening of the proportioning ports, is controlled by a valve 75 having a piston-like shape with a cylindrical surface of approximately the width of the dimension of ports 24, 25 in the direction of movement of the valve. The piston-like end surface of the valve has an aperture 76 for equalizing the pressure of the mixed gases on the two sides of the valve. A stem 77 is rotatably attached axially of the valve with one end exposed on one side of the valve and provided with a threaded socket to receive the threaded end of the diaphragm rod 38. The stem 77 is however secured to the valve and cannot drop accidentally into the device. The other end of the valve stem 77 is slotted to receive a tool for screwing the valve stem to the diaphragm rod. The valve 75 has a free sliding fit in the tube 47 and is reciprocated in such tube as the diaphragm 37 flexes. One side of the diaphragm is subjected to the pressure in one inlet chamber by way of a passage 78 while the other side of the diaphragm is subjected to the pressure of the gas mixture.

One inlet chamber will usually be supplied with air or other gas at atmospheric pressure and the diaphragm is therefore responsive to variations in reaction which vary the demand for and pressure of the gas mixture. As the demand for the gas mixture increases, the pressure in the mixing chamber decreases so that the diaphragm flexes upwardly and lifts the control valve. The control valve opens both ports farther by the same amount unless the edges of the segment 46 or the tube 47 are at an angle to each other or are shaped otherwise than as parallel edges which are parallel to the axis of the control valve. Such angularity or other shaping of either the edge 69 or 70 or both such edges varies the proportions of the gases responsive to the demand without change in the gas proportions at the beginning of or at other given points of the reaction.

The outlet 23 from the mixing chamber 22 has a valve seat 82 formed about its periphery and a pipe nipple 83 is attached to the casing 15 and is, in fact, an extension of the outlet. The nipple provides two abutments 84, 85 of which the end of abutment 84 coacts with the casing in defining a notch-like space. A disk 86 rests on its edge in the notch and may tilt away from its seat 82 until such tilting is stopped by the abutment 85. The valve has a threaded arm extending therefrom toward the mixing chamber 22 to support a number of counter-weights 87 which bias or urge the valve toward its seat against the pressure of the gas mixture flow past the valve. The weights are adjustable to allow counter-weighting for opening of the valve only when flow of gas mixture takes place so that even a small back pressure in the nipple will co-act with the weights in closing the valve.

It will therefore be seen that the present invention provides a casing and other parts which can be made in one standard size for many combinations (volumes) of gases and for varying conditions during use of such combinations, with the work for internal finishing of the casing confined to only one chamber open at both ends and with such work reduced to a minimum. A tube segment and a tube are individually shaped at only their co-acting edges to adapt the device exactly to any combination of gas and any conditions occurring in such combinations at different times during a reaction. An initial or gross proportioning is obtained by the proper sizing and placing of the segment and the segment is readily interchanged with other segments depending on the gas combination or reaction conditions. Neither the gas proportioning means nor the gas volume controlling means affect the operation of the other and fine adjustment can be made of the proportioning means. Such adjustment can be changed to a degree shown on a scale and can be returned exactly to its prior setting. The closure window allows observation of the relatively moving parts and determination of when cleaning is required or that the parts are operating satisfactorily at various flow conditions. The closure is a simple ring removable and replaceable without tools. The adjustment for the gas proportioning means is a micrometer screw unit which is free from back-lash and is easily and quickly removed and replaced by a clean unit to preserve accuracy and ease of adjustment. A simple tilting disk and its biasing weights provide a check valve free from parts requiring frequent cleaning and which increase resistance to gas flow even when clean. The entire device is sealed against leakages and can therefore be used for any combinations of any gases.

Various changes and modifications may be made in the embodiment of the invention herein disclosed, without departing from the spirit of the invention or from the scope of the appended claims.

We claim:

1. In a gas mixing and proportioning device, a unitary casing providing a plurality of gas receiving chambers each having an inlet and a gas mixing chamber having an outlet and having ports therein connecting each receiving chamber with the mixing chamber, a segment of a cylindrical tube interchangeably mounted in the mixing chamber for partially defining the open area of the several ports, a cylindrical tube rotatable in the mixing chamber and having a wall portion co-acting with the segment for partially defining the open area of the ports, means extending into one receiving chamber through the casing wall and in sealed relation therewith for rotating the tube to vary the open area of the ports, said means being removable and replaceable as a unit without affecting other movable portions of the device, a valve reciprocable in the tube segment and tube for controlling the volume of gas flowing from the receiving chambers into the mixing chamber, means responsive to the gas pressure in one receiving chamber and in the mixing chamber for reciprocating the valve, a rod connecting the pressure responsive means with the valve, and means for guiding movement of the rod to prevent torsion of the pressure responsive means and co-acting with the segment and the tube in defining the open area of the ports.

2. In a gas mixing and proportioning device, a unitary casing providing a plurality of gas receiving chambers each having an inlet and a gas mixing chamber having an outlet, the casing having ports therein connecting each receiving chamber with the mixing chamber, a segment of a cylindrical tube interchangeably mounted in the mixing chamber for partially defining the open area of the several ports, a cylindrical tube rotatable in the mixing chamber and having a wall portion co-acting with the segment for partially defining the open area of the ports, means extending into one receiving chamber through the casing wall and in sealed relation therewith for rotating the tube to vary the open area of the ports, a valve reciprocable in the tube segment and tube for controlling the volume of gas flowing from the receiving chambers into the mixing chamber, means responsive to the gas pressure in one receiving chamber and in the mixing chamber for reciprocating the valve, a rod connecting the pressure responsive means with the valve, and means for guiding movement of the rod to prevent torsion of the pressure responsive means and co-acting with the segment and the tube in defining the open area of the ports, pairs of edges of the segment and the tube being shaped to define non-rectangular open areas of the ports.

3. In a gas mixing and proportioning device, a unitary casing providing a plurality of gas receiving chambers each having an inlet and a gas mixing chamber having an outlet, the casing have ports therein connecting each receiving chamber with the mixing chamber, a segment of a cylindrical tube interchangeably mounted in the mixing chamber for partially defining the open area of the several ports, a cylindrical tube rotatable in the mixing chamber and having a wall portion co-acting with the segment for partially defining the open area of the ports, means extending into one receiving chamber through the casing wall for rotating the tube to vary the open area of the ports, said means being removable and replaceable as a unit without affecting other movable portions of the device and comprising a plug sealed in the receiving chamber opening and having a projection therefrom, a nut slidably supported by the plug projection, a screw extending through the plug and sealed therein for engagement with the nut, and resilient means movably mounted in the nut and engageable with the tube.

4. In a gas mixing and proportioning device, a unitary casing providing a plurality of gas receiving chambers each having an inlet and a gas mixing chamber having an outlet, the casing having ports therein connecting each receiving chamber with the mixing chamber, a segment of a cylindrical tube interchangeably mounted in the mixing chamber for partially defining the open area of the several ports, a cylindrical tube rotatable in the mixing chamber and having a wall portion co-acting with the segment for partially defining the open area of the ports, means extending into one receiving chamber through the casing wall for rotating the tube to vary the open area of the ports, said means being removable and replaceable as a unit without affecting other movable portions of the device and a plug sealed in the receiving chamber opening and having a hollow cylindrical projection into the chamber, the projection being slotted from one end, a nut slidably supported in the plug projection, a screw extending through the plug and sealed therein for engaging the nut, and a pin movably mounted in the nut and resiliently urged into engagement with the tube for rotation thereof, the pin being guided in the slots at the end of the plug projection.

5. In a gas mixing and proportioning device, a unitary casing providing a plurality of gas receiving chambers each having an inlet and a gas mixing chamber having an outlet and having ports therein connecting each receiving chamber with the mixing chamber, a segment of a cylindrical tube interchangeably mounted in the mixing chamber for partially defining the open area of the several ports, a cylindrical tube rotatable in the mixing chamber and having a wall portion co-acting with the segment for partially defining the open area of the ports, means extending into one receiving chamber through the casing wall and in sealed relation therewith for rotating the tube to vary the open area of the ports, a valve reciprocable in the tube segment and tube for controlling the volume of gas flowing from the receiving chambers into the mixing chamber, a stem rotatably secured to the valve and extending on both sides thereof, means responsive to gas pressure in one receiving chamber and in the mixing chamber for reciprocating the valve, and a rod connectible with the valve stem upon rotation of the stem, and means for guiding movement of the rod to prevent torsion of the diaphragm upon connection of the stem with the rod, an edge of the segment aiding in defining the open area of one port and being at an angle to the center line of the mixing chamber for varying the ratio of port openings as the rate of flow of gases varies.

6. In a gas mixing and proportioning device, a unitary casing providing a plurality of gas receiving chambers each having an inlet and a gas mixing chamber having an outlet and having ports therein connecting each receiving chamber with the mixing chamber, the mixing chamber being open at both ends to exteriorly of the casing, a segment of a cylindrical tube interchangeably mounted in the mixing chamber for partially defining the open area of the several ports, a cylindrical tube rotatable in the mixing chamber and having a wall portion co-acting with the segment for partially defining the open area of the ports, means extending into one receiving chamber through the casing wall and in sealed relation therewith for rotating the tube to vary the open area of the ports, a valve reciprocable in the tube segment and tube for controlling the volume of gas flowing from the receiving chambers into the mixing chamber, means responsive to the gas pressure in one receiving chamber and in the mixing chamber for reciprocating the valve, a rod connecting the pressure responsive means with the valve, means for guiding movement of the rod to prevent torsion of the pressure responsive means and co-acting with the segment and the tube in defining the open area of the ports, a readily removable closure at one end of the mixing chamber providing a window for observation of relatively movable parts within the casing, and a referance scale attached to the tube and visible through the window, the window having a zero line for co-action with the scale.

7. In a gas mixing and proportioning device, a unitary casing providing a plurality of gas receiving chambers each having an inlet and a gas mixing chamber having an outlet and having ports therein connecting each receiving chamber with the mixing chamber, the mixing chamber being open at both ends to exteriorly of the casing, a segment of a cylindrical tube interchangeably mounted in the mixing chamber for partially defining the open area of the several ports, a cylindrical tube rotatable in the mixing chamber and having a wall portion co-acting with the segment for partially defining the open area of the ports, means extending into one receiving chamber through the casing wall and in sealed relation therewith for rotating the tube to vary the open area of the ports, a valve reciprocable in the tube segment and tube for controlling the volume of gas flowing from the receiving chambers into the mixing chamber, means responsive to the gas pressure in one receiving chamber and in the mixing chamber for reciprocating the valve, a rod connecting the pressure responsive means with the valve, means for guiding movement of the rod to prevent torsion of the pressure responsive means and co-acting with the segment and the tube in defining the open area of the ports, a transparent plate closing one end of the mixing chamber and having a zero line thereon, a ring engaging the casing for holding the plate in sealed relation thereto, and a reference scale attached to the end of the tube and visible through the plate for co-action with the zero line in indicating the position of the tube relative to the segment.

8. In a gas mixing and proportioning device, a unitary casing providing a plurality of gas receiving chambers each having an inlet and a gas mixing chamber having an outlet and having ports therein connecting each receiving chamber with the mixing chamber, the mixing chamber being open at both ends to exteriorly of the casing, a segment of a cylindrical tube interchangeably mounted in the mixing chamber for partially defining the open area of the several ports, a cylindrical tube rotatable in the mixing chamber and having a wall portion co-acting with the segment for partially defining the open area of the ports, means extending into one receiving chamber through the casing wall and in sealed relation therewith for rotating the tube to vary the open area of the ports, a valve reciprocable in the tube segment and tube for controlling the volume of gas flowing from the receiving chambers into the mixing chamber, means responsive to the gas pressure in one receiving chamber and in the mixing chamber for reciprocating the valve, a rod connecting the pressure responsive means with the valve, means for guiding movement of the rod to prevent torsion of the pressure responsive means and co-acting with the segment and the tube in defining the open area of the ports, an outlet nipple attached to the casing at the mixing chamber outlet, a valve movable to open position limited by the outlet nipple, and adjustable weights associated with the valve and urging the valve toward closed position.

9. In a gas mixing and proportioning device, a unitary casing providing a plurality of gas receiving chambers each having an inlet and a gas mixing chamber having an outlet and having ports therein connecting each receiving chamber with the mixing chamber, the mixing chamber being open at both ends to exteriorly of the casing, a segment of a cylindrical tube interchangeably mounted in the mixing chamber for partially defining the open area of the several ports, a cylindrical tube rotatable in the mixing chamber and having a wall portion co-acting with the segment for partially defining the open area of the ports, means extending into one receiving chamber through the casing wall and in sealed relation therewith for rotating the tube to vary the open area of the ports, a valve reciprocable in the tube segment and tube for controlling the volume of gas flowing from the receiving chambers into the mixing chamber, means responsive to the gas pressure in one receiving chamber and in the mixing chamber for reciprocating the valve, a rod connecting the pressure responsive means with the valve, means for guiding movement of the rod to prevent torsion of the pressure responsive means and co-acting with the segment and the tube in defining the open area of the ports, an outlet nipple attached to the casing at the mixing chamber outlet, a valve positioned by the casing and the stationary nipple, abutments in the nipple limiting movement of the valve in one direction, and weights overhung from the valve toward the mixing chamber for urging the valve toward closed position.

References Cited in the file of this patent

UNITED STATES PATENTS

| | | |
|---|---|---|
| 1,980,770 | Thomas | Nov. 13, 1934 |
| 2,252,152 | Work | Aug. 12, 1941 |
| 2,486,017 | Furkert | Oct. 25, 1949 |